Figure 6:
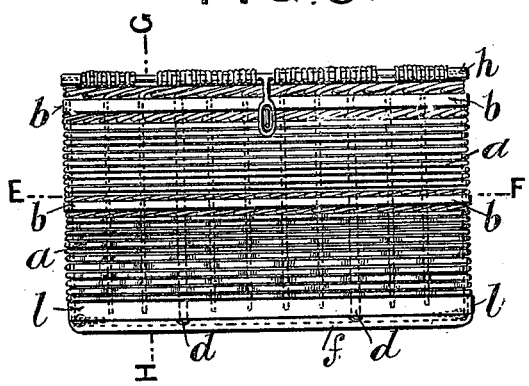

(No Model.) 2 Sheets—Sheet 2.

J. P. MILBOURNE & T. HUMPHREYS.
BASKET AND SKIP.

No. 332,407. Patented Dec. 15, 1885.

Witnesses:
Willard R Haight
J W Reynolds

Inventors:
John Parker Milbourne
Thomas Humphreys
by W H Babcock
Attorney

N. PETERS, Photo-Lithographer, Washington, D. C.

(No Model.) 2 Sheets—Sheet 1.
J. P. MILBOURNE & T. HUMPHREYS.
BASKET AND SKIP.
No. 332,407. Patented Dec. 15, 1885.
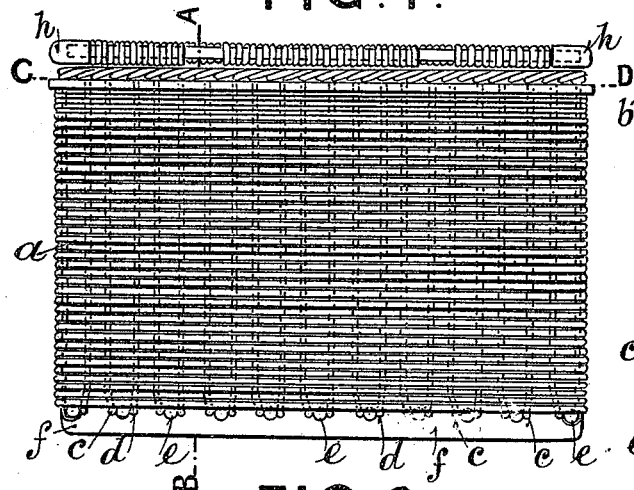
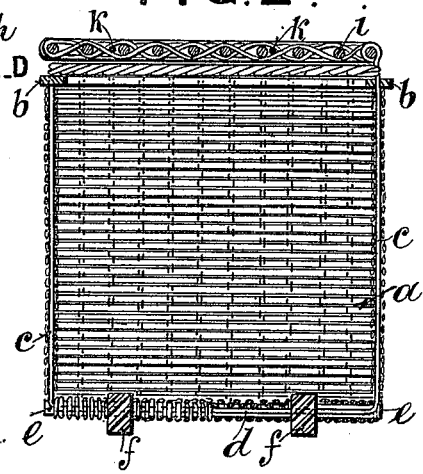
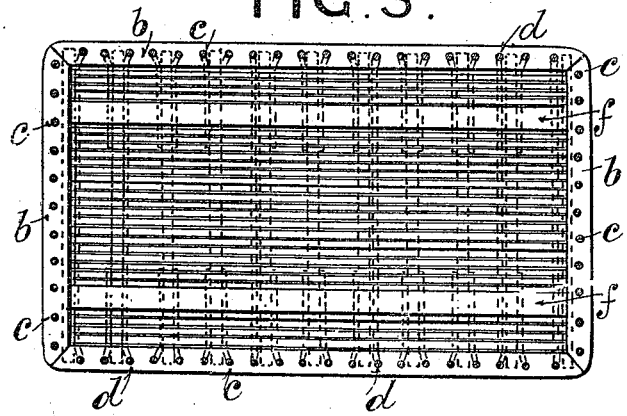
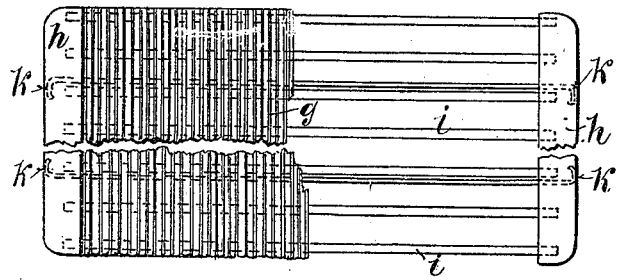
Witnesses
Willard R. Haight
J. W. Reynolds
Inventors:
John Parker Milbourne
Thomas Humphreys
by W. H. Babcock
Attorney

United States Patent Office.

JOHN PARKER MILBOURNE AND THOMAS HUMPHREYS, OF MANCHESTER, COUNTY OF LANCASTER, ENGLAND; SAID THOMAS HUMPHREYS ASSIGNOR TO SAID JOHN PARKER MILBOURNE.

BASKET AND SKIP.

SPECIFICATION forming part of Letters Patent No. 332,407, dated December 15, 1885.

Application filed May 25, 1885. Serial No. 166,585. (No model.) Patented in England September 5, 1884, No. 12,031.

*To all whom it may concern:*

Be it known that we, JOHN PARKER MILBOURNE and THOMAS HUMPHREYS, both subjects of the Queen of Great Britain, residing at Manchester, in the county of Lancaster, England, have invented a new and useful Improvement in Baskets, Skips, and other Similar Receptacles, (for which we have obtained a patent in Great Britain, No. 12,031, bearing date September 5, 1884,) of which the following is a specification.

Our invention relates to improvements in the manufacture of baskets, skips, and other similar articles; and the objects of our improvements are, first, to make the basket or skip stronger and more durable than those of the ordinary construction; and, secondly, to increase the rigidity of the lid and sides, thus dispensing with the necessity for cording and sealing the ends, in order to prevent the contents being abstracted during transit. We attain these objects by constructing the basket or skip with a solid wood or metal rail immediately under the top border, and extending round all or any of the sides, the sticks or runners which form the frame or skeleton passing through holes in this rail. More than one such rail placed at a suitable distance below that described may be employed, if desired.

In place of securing the "clogs" or "shoes" to the bottom of the skip with nails or other fastenings in the ordinary manner, we bore holes in the clogs, through which are passed the "sticks" forming the frame or skeleton of the bottom. When "runners"—*i. e.*, sticks which extend across the bottom and up the sides—are employed, we pass them through the clogs, and in like manner, if desired, we may also pass through the clogs the ends of the sticks which form the frame or skeleton for the sides. We make each end of the lid of a wood or metal rail, and bore holes partly through these rails, into which the ends of the sticks forming the frame or skeleton of the lid project; or, if preferred, some or all of the holes may be bored entirely through these end rails and the sticks secured in them. The rails are or may be further held together by passing one or more metal rods or bars through the wicker-work of the lid and securing the rod or rods to the rails at each end. When extra strength for the lid is required, one or more rails may be placed between and at a suitable distance from the two end rails.

In order that our invention may be fully understood and readily carried into effect, we will describe the accompanying two sheets of drawings, in which—

Figure 7:
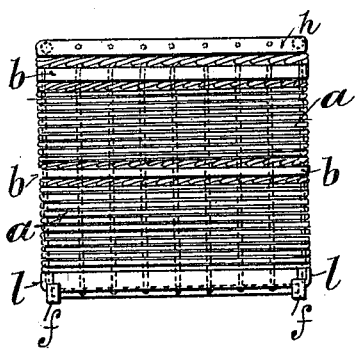
Figure 8:
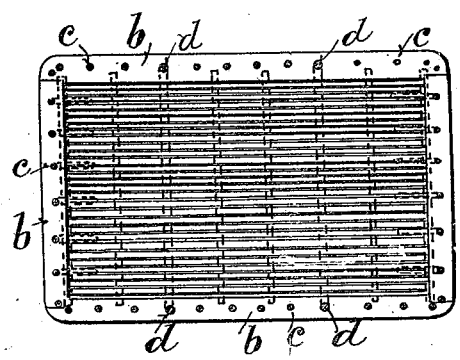
Figure 9:
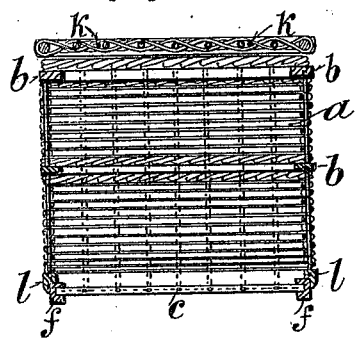
Figure 10:
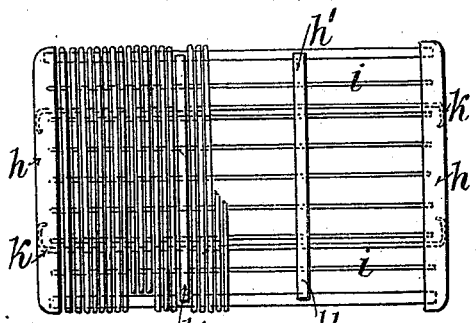
Figure 11:
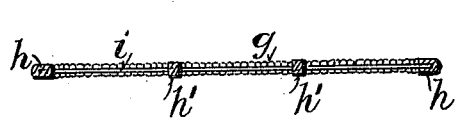

Figure 1 is a front elevation of a basket or skip made according to our invention. Fig. 2 is a vertical section on the line A B, Fig. 1. Fig. 3 is a sectional plan on the line C D, Fig. 1, looking downward. Fig. 4 is a plan, and Fig. 5 a vertical section, of the lid, with part of the wicker-work removed, in order to show the construction more clearly. Fig. 6 is a front elevation, and Fig. 7 an end view, of a basket or skip of a slightly-modified construction. Fig. 8 is a sectional plan on the line E F, Fig. 6, looking downward. Fig. 9 is a vertical section on the line G H, Fig. 6, the lid having been removed. Fig. 10 is a plan, and Fig. 11 a vertical section of the lid with part of the wicker-work removed, in order to show the construction more clearly.

Similar letters refer to similar parts throughout the several views.

In Figs. 1 to 5, *a* represents the wicker-work of the skip, and *b* the wood or metal rail, placed immediately under the top border and extending round all four sides. The rods known as "sticks" *c* and "runners" *d*, on which the wicker-work of the sides is built, pass through holes formed in the rail *b*. The ends of the sticks *c*, as well as the sticks *e* and runners *d*, on which the wicker-work of the bottom is built, pass through the clogs *f*. The clogs thus form part of the bottom of the skip, and are secured by every bottom stick *e*, as well as by the runners *d* and side sticks, *c*. Nails, bolts, or other fastenings are thus dispensed with, and the clogs are held more securely and cannot possibly work loose or become detached. The lid *g* has a wood or metal rail, *h*, at each end, connected by the sticks *i*, upon which the wicker-work of the lid is built. The ends of the sticks $i$ are fixed in holes in the end rails, $h$, which are shown further connected together and to the lid by the metal rods $k$, which pass through and are secured to the rails, as shown in Figs. 4 and 5 of the drawings, or in any other suitable manner.

In the slightly-modified construction of basket or skip illustrated by Figs. 6 to 11 the clogs $f$ are placed at or near the edges of the bottom of the skip, and a rail, $l$, through which all or some of the side sticks, $c$, and runners $d$ pass, is employed, instead of the ordinary willow or cane "upset," and a second rail, $b$, is employed, extending round all four sides of the skip. To give additional strength to the lid, two cross-rails, $h'$, through which the sticks $i$ and metal rods $k$ pass, are placed at suitable distances apart and parallel to the end rails, $h$.

Having now particularly described and ascertained the nature of our said invention and in what manner the same is to be performed, we declare that what we claim as our invention, and desire to secure by Letters Patent of the United States, is—

1. The combination of the upright rods $c$ and the wicker-work, which is built thereon, with the clogs $f$ at the bottom of the basket and the rail $b$ at the top thereof, said rail being perforated to receive the upper ends of said rods, and said clogs being recessed to receive the lower ends thereof, substantially as set forth.

2. A basket-lid consisting of the rods or sticks $i$, the wicker-work built thereon, and the rails $h$, which are recessed to receive the ends of said rods, substantially as set forth.

3. The combination of the metal rods $k$ and sticks $i$ with the rails $h$, which are recessed to receive the ends of said sticks and rods, and the wicker-work built on said sticks, the whole forming the cover of a basket or similar article, substantially as set forth.

The foregoing specification of our improvement in the manufacture of baskets, skips, and other similar receptacles signed by us this 29th day of April, 1885.

JOHN PARKER MILBOURNE.
THOMAS HUMPHREYS.

Witnesses:
H. B. BARLOW,
S. W. GILLETT,
*Both of 4 Mansfield Chambers, 17 St. Ann's Square, Manchester.*